United States Patent [19]

Byrnes

[11] Patent Number: 4,895,354

[45] Date of Patent: Jan. 23, 1990

[54] EQUALIZING STRESS DISTRIBUTION IN EACH LAMINATE OF AN ASYMMETRICALLY LOADED ELASTOMERIC BEARING

[75] Inventor: Francis E. Byrnes, White Plains, N.Y.

[73] Assignee: United Technologies Corporation, Hartford, Conn.

[21] Appl. No.: 733,432

[22] Filed: May 13, 1985

[51] Int. Cl.$^4$ .............................................. F16F 1/40
[52] U.S. Cl. ............................... 267/141.1; 267/140.5; 384/221; 416/134 A
[58] Field of Search ................ 267/63 R, 63 A, 140.5, 267/141.1, 141.2, 141.3, 141.4, 141.5, 141.7, 153; 416/134 A, 141; 280/716; 384/220, 221, 222

[56] References Cited

U.S. PATENT DOCUMENTS

| | | | |
|---|---|---|---|
| 2,126,707 | 8/1938 | Schmidt | 267/63 A |
| 3,171,622 | 3/1965 | Tolan, Jr. | 267/63 A X |

FOREIGN PATENT DOCUMENTS

| | | | |
|---|---|---|---|
| 203394 | 7/1955 | Australia | 267/141.2 |
| 2039162 | 1/1971 | France | 267/63 R |

Primary Examiner—George E. A. Halvosa

[57] ABSTRACT

A hollow spherical or conical elastomeric bearing has an elliptical inner surface whose minor diameter is aligned with the resultant nonaxial load under a compressive axial load.

4 Claims, 1 Drawing Sheet

EQUALIZING STRESS DISTRIBUTION IN EACH LAMINATE OF AN ASYMMETRICALLY LOADED ELASTOMERIC BEARING

DESCRIPTION

Technical Field of the Invention

The invention relates to elastomeric bearings comprising alternate laminates of elastomer and nonextensible shims, bonded between two races and, more particularly, to "hollow" spherical and conical elastomeric bearings.

BACKGROUND OF THE INVENTION

Spherical elastomeric bearings permit motion around three mutually perpendicular axes through elastomer shear loading, while high loads are reacted axially in elastomer compression. Some radial loading can be accommodated, depending on the degree of "wrap-around" (spherical radii versus outside diameter). Conical elastomeric bearings, have the ability to react high loads in both the axial and radial directions, through compression and shear of the elastomer, while accommodating torsional motions in elastomer shear. The axial and radial stiffnesses are normally quite high, depending on the included angle of the cone, while the torsional mode has a relatively low stiffness. (Lastoflex ® Bearing Design Guide, Report No. PE 76-006, pages I-11 and I-12, issued Jan. 30, 1976 by the Product Engineering Department of Lord Kinematics, Erie, Pa.)

Much thought has been devoted to the subject of improving fatigue life in elastomeric bearings. A basic problem is that the loads are not evenly distributed from laminate-to-laminate. For the elastomer laminates, this means that a particular laminate will fail first. (The normal mode of deterioration is a slow abrasion of the elastomer which can be visually monitored.)

U.S. Pat. No. 4,435,097 (Peterson, 1984) adequately describes the problem. "A significant commercial variety of bearings is characterized by the alternating bonded lamellae being disposed concentrically about a common center, i.e., so that successive alternating layers of resilient and nonextensible materials are disposed at successively greater radial distances from the common center. This variety of bearings includes a number of different configurations, notably bearings which are cylindrical, conical or generally spherical in shape or which are essentially sectors of cylinders, cones and spheres. Such bearings typically are used in aircraft, especially as rotor shaft supports in helicopters. As noted in U.S. Pat. No. 3,679,197 (Schmidt, 1972), bearings of this type frequently are required to accommodate cyclic torsional motion about a given axis while simultaneously carrying a large compressive load along that axis, with the result that greater compressive stresses and shear stresses and strains are established in the resilient layers closest to the common center and failure from fatigue encountered in accommodating the torsional motion tends to occur at the innermost resilient layer. Schmidt proposed to improve the fatigue life of such bearings by progressively increasing the thicknesses of successive layers of resilient material with increasing radius and simultaneously to progressively decrease the modulus of elasticity of those same layers with increasing radius. However, the Schmidt technique is expensive in that it requires that each elastomer layer be made of a different material. Thus an elastomeric bearing consisting of fifteen resilient layers necessitates provision of fifteen different "elastomer materials." Peterson discloses forming at least some of the elastomer laminates of at least two different elastomer stocks having different elasticity characteristics.

The above-described techniques for improving bearing fatigue life each tackle the problem from the viewpoint of matching the elastomer, on a laminate-by-laminate basis, to the stress distribution throughout the bearing. A more subtle problem exists in that stress distribution is not even throughout a given laminate, especially in an asymmetrically loaded bearing.

DISCLOSURE OF THE INVENTION

Therefore, it is an object of the invention to equalize the stress distribution in each laminate of an asymmetrically loaded elastomeric bearing.

It is another object of the invention to optimize the fatigue life of an asymmetrically loaded bearing, relative to a given bearing weight.

Although the invention applies to both the elastomer and shim laminates, it is discussed mainly in the context of the elastomer laminates.

According to the invention, a hollow asymmetrically-loaded elastomeric bearing has an elliptical inner surface, the minor diameter of which is aligned with the resultant motion under a compressive axial load. With the proper elliptical inner surface relative to a given bearing geometry, a uniform vibratory stress is approached throughout each laminates.

According further to the invention, each elastomer laminate is progressively thicker (and/or of a lower modulus) than the next nearer laminate to the bearing center so that stress throughout all of the laminates is equalized.

Other objects, features and advantages of the invention will become apparent in light of the following description thereof.

BEST MODE FOR CARRYING OUT THE INVENTION

Figure 1:
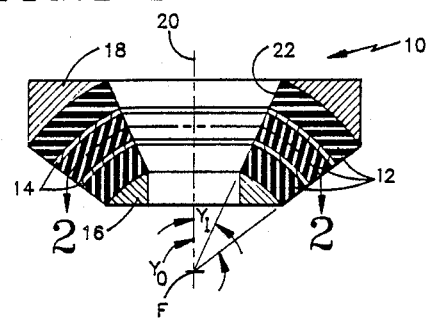
FIG. 1 is a cross section taken through the axis of a hollow spherical elastomeric bearing of the prior art.

FIG. 1 is an axial cross section of a hollow spherical elastomeric bearing 10. Alternate curved laminates of resilient elastomer 12 and nonresilient shims 14 are bonded together between an inner race 16 and an outer race 18. The center of curvature for the bearing is at a point F, which is along the bearing centerline (axis) 20.

The bearing 10 is hollow along its axis, having a conical inner surface 22. This type of bearing is employed in helicopter rotor systems, such as that shown in U.S. Pat. No. 3,932,059 (Rybicki, 1976), to react blade lead-lag motion and flapping (normal to the axis 20), while allowing for blade pitch changes (around the axis 20), under centrifugal (axial) loads.

Figure 2:
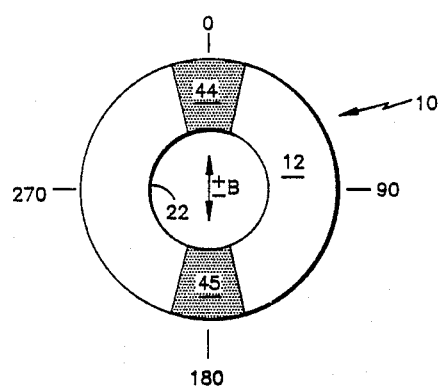
FIG. 2 is a diagrammatic view of the bearing of FIG. 1 taken through the Section 2—2.

As viewed in FIG. 2, the hollow inner surface 22 of the bearing 10 has a circular cross section normal to the bearing axis. Circumferential positions around the bearing are indicated by degrees. In the context of a rotor system, blade lead-lag motion corresponds to the 90 and 270 degree positions, and flapwise motion corresponds to the 0 and 180 degree positions.

Figure 3:
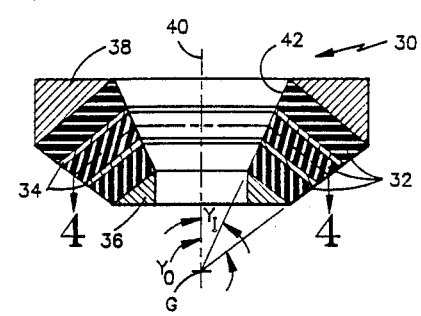
FIG. 3 is a cross section taken through the axis of a hollow conical elastomeric bearing of the prior art.

FIG. 3 shows a conical elastomeric bearing 30. Alternate conical laminates of resilient elastomer 32 and non-resilient shims 34 are bonded together between two races 36 and 38. Similar to the spherical bearing 10 of FIG. 1, the "center of curvature" (which is the apex of the cone) for the bearing 30 of FIG. 3 is a point G which is along the bearing axis 40. Likewise, the bearing 30 is hollow along its axis 40, resulting in a conical inner surface 42.

Figure 4:
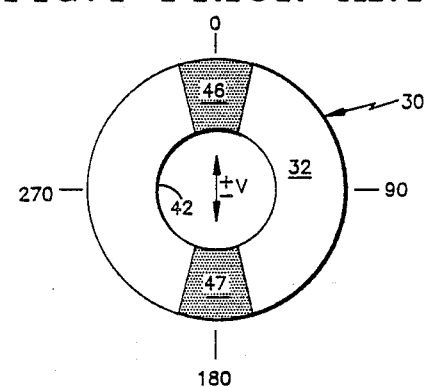
FIG. 4 is a diagrammatic view of the bearing of FIG. 3 taken through the section 4—4.

FIG. 4 is a view of the bearing 30, taken along the line 4—4 of FIG. 3 showing the circular cross section of the inner-surface 42 normal to the bearing axis 40, and is marked off positionally around its circumference in degrees.

As shown in FIG. 1 and FIG. 3, $Y_I$, which is the angle of the inner surface from the axis, at any given distance from the center of curvature (F or G) is constant. $Y_0$, which is the angle of the bearing outer surface from the center of curvature is also constant.

Blade flapping (0 and 180 degrees) results in a rotation $\pm B$ in the spherical bearing 10 and in a radial shear $\pm V$ in the conical bearing 30. (For purposes of this discussion, rotation $\pm B$ and radial shear $\pm V$ are termed "nonaxial loads".) Stress, at any given position throughout a laminate, is a function of the cosine of the angle $\theta$ to the applied nonaxial load. Therefore, for blade flapping, there will be a nonuniform vibratory stress distribution with stress concentrations at 0 and 180 degrees, as indicated by the shaded portions 44–47 in FIGS. 2 and 4. Blade lead/lag motion, at 90 and 270 degrees, is also a factor, but is typically one-fifth the magnitude of flapping.

Since fatigue life is related to the 5th power of stress, a nonuniformity of 10 percent can halve bearing life.

Under asymmetric loads or motions as described above, a primary first harmonic elastomer and shim stress is produced that cannot be optimized using existing bearing design procedures.

Figure 6:
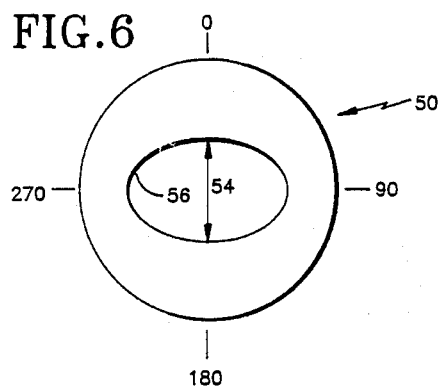
FIG. 6 is a diagrammatic view of the bearing of FIG. 5 taken through the section 5—5.
Figure 5:
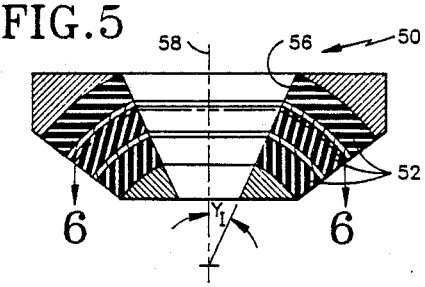
FIG. 5 is an axial cross section of the bearing of this invention.

According to the invention, the hollow inner surface of a spherical or conical bearing, such as the bearings 10 and 30, is elliptical in cross section normal to the bearing axis. This is seen in FIG. 5, an axial cross section of a spherical embodiment of the bearing 50 of this invention, and FIG. 6, a cross section of the bearing 50 taken normal to the axis through the middle elastomer layer 52. The minor diameter 54 of the elliptical inner surface 56 is aligned with blade flapping motion (0 and 180 degrees). This puts more elastomer where the stress is greatest. With the elliptical cross section, the angle $Y_I$ intercepted by the elliptical inner surface 56 with respect to the bearing axis 58 varies around the circumference of the bearing. With the proper elliptical inner surface relative to a given bearing geometry, a uniform vibratory stress can be approached in the bearing laminates. In other words, the stress (and, for an elastomer laminate, the fatigue life) throughout a laminate can be equalized.

Consider blade flapping, as discussed. The shim and elastomer vibratory stresses are described in the following equations:

$$\text{Shim Vibratory Stress} \sim \frac{K\cos\theta}{\sin\left[\frac{Y_o - Y_I^2}{2}\right]\tan\left[\frac{Y_o + Y_i}{2}\right]}$$

Elastomer Vibratory Stress ~

$$\frac{\left(\ln\frac{1 + \cos Y_I}{1 - \cos Y_I} - \ln\frac{1 + \cos Y_0}{1 - \cos Y_0}\right)(K - \sin Y_I)^{\cos\theta}}{\cos Y_I - \cos Y_0}$$

From either equation it may be observed that the vibratory stresses could be equalized throughout the laminate if $Y_I$ (or $Y_0$) were made to vary with $\theta$.

Aside from making the hollow inner surface elliptical in cross section to equalize stress throughout each laminate, stress can be equalized throughout the entire bearing, in other words from laminate-to-laminate, by progressively increasing the thickness of the elastomer laminates (and/or decreasing the modulus) with increasing radius, as illustrated in FIG. 5.

I claim:

1. A spherical elastomeric bearing having a centerpoint, alternate laminates of elastomeric material and nonresilient material disposed at increasing radii about the centerpoint, and a hole disposed through each laminate normal to a bearing axis through the centerpoint, characterized in that the holes are elliptical, each elliptical hole having a major axis and a minor axis aligned with the respective major and minor axis of each other elliptical hole.

2. A bearing according to claim 1 wherein the minor axes of the elliptical holes are oriented in a direction of greater applied force to the bearing than a force applied in the direction of the major axes.

3. A conical elastomeric bearing having a central bearing axis, alternate laminates of elastomeric material and nonresilient material disposed at increasing radii about the central bearing axis, and a hole disposed through each laminate normal to the central axis, characterized in that the holes are elliptical, each elliptical hole having a major axis and a minor axis aligned with the respective major and minor axis of each other elliptical hole.

4. A bearing according to claim 3 wherein the minor axes of the elliptical holes are oriented in a direction of greater applied force to the bearing than a force applied in the direction of the major axes.

* * * * *